US006244647B1

(12) United States Patent
Allison

(10) Patent No.: US 6,244,647 B1
(45) Date of Patent: Jun. 12, 2001

(54) CONTROLLED RATE HINGE RESPONSIVE TO WEIGHT

(75) Inventor: Johnny Hugh Allison, Plymouth, MI (US)

(73) Assignee: Visteon Corporation, Dearborn, MI (US)

(*) Notice: Subject to any disclaimer, the term of this patent is extended or adjusted under 35 U.S.C. 154(b) by 0 days.

(21) Appl. No.: 09/442,611

(22) Filed: Nov. 18, 1999

(51) Int. Cl.[7] ............................................. B60N 3/12
(52) U.S. Cl. ..................... 296/37.12; 296/37.1; 296/37.8
(58) Field of Search ............................ 296/37.12, 37.8, 296/37.1; 220/827, 828

(56) References Cited

U.S. PATENT DOCUMENTS 1,089,523   3/1914   Barnett .

Primary Examiner—D. Glenn Dayoan
Assistant Examiner—Mickki D. Murray
(74) Attorney, Agent, or Firm—Mark L. Mollon

(57) ABSTRACT

A combination for a hinge assembly having first and second hinged leafs movable about a common axis. The combination has a first hinge leaf with an integral plastic camming surface positioned eccentrically about the common axis, a second hinged leaf with an integral plastic cam follower surface positioned about the common axis to engage the camming surface with increasing friction as the camming surface is cammed thereagainst, and structures for increasing the frictional engagement between the camming surface and cam follower surface in response to weight added to either of the hinged leafs to control the rate at which the leafs rotate relative to each other.

8 Claims, 3 Drawing Sheets

CONTROLLED RATE HINGE RESPONSIVE TO WEIGHT

TECHNICAL FIELD

This invention relates to slow-opening hinged doors, and particularly to compartment doors, such as used for glove compartments in automobiles which have hinged doors that may tilt with the compartment to expose or open its interior.

DISCUSSION OF THE PRIOR ART

It is desirable to enhance the quality of a glove box door operation to have a slow or controlled rate of door opening. Controlled rate hinges have heretofore proven to be too expensive or heavy to be suitable for the light touch and feel that is required by modern automotive customers.

SUMMARY OF THE INVENTION

This invention provides a less expensive and simpler way to control movement of automotive glove box doors. To this end, the invention is an assembly having a variable friction regulated hinged door that comprises: first and second hinged leafs movable about a common axis, the first hinge leaf having an integral plastic camming surface positioned eccentrically about the common axis, the second hinged leaf having an integral plastic cam follower surface positioned about the common axis to engage the camming surface with increasing friction as the camming surface is cammed against the follower; and means for increasing the frictional engagement between the camming surface and the cam follower surface in response to weight added to either of said hinged leafs to control the rate at which the leafs rotate relative to each other.

BRIEF DESCRIPTION OF THE DRAWINGS

FIG. 1 is a schematic perspective view of an automotive glove box assembly utilizing the invention wherein;

DETAILED DESCRIPTION AND BEST MODE

Figure 1:
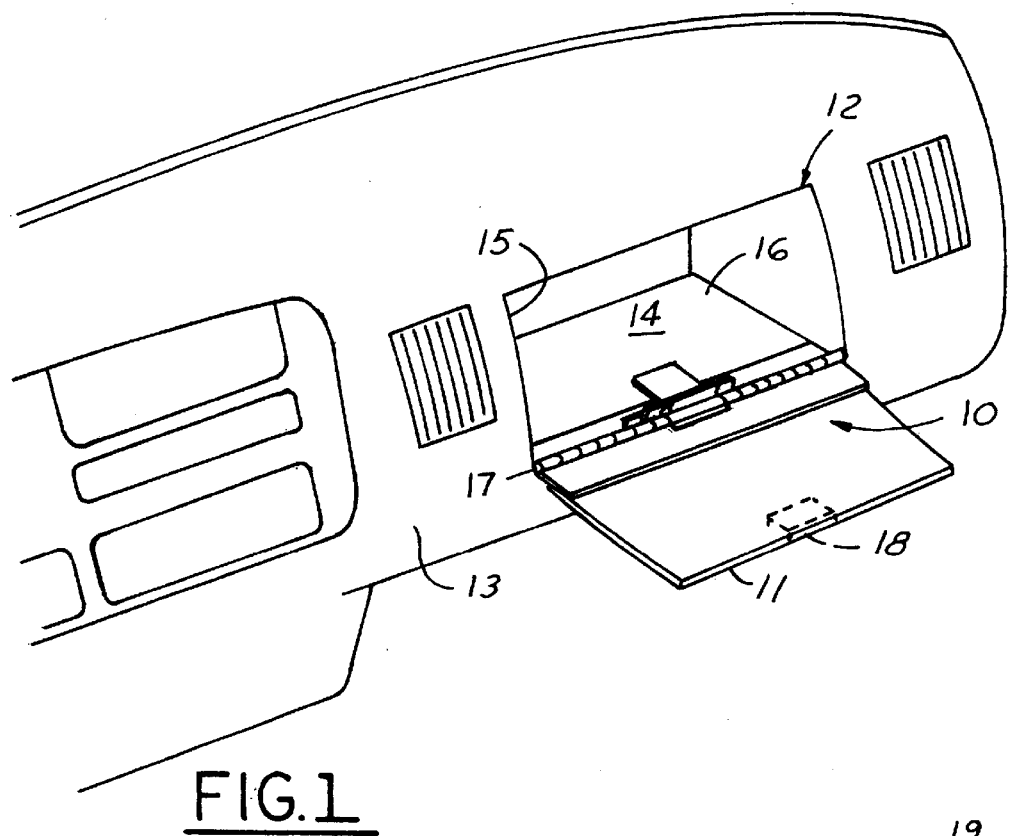

As shown in FIG. 1, the hinge assembly 10 is used to pivotally support a door 11 that closes a glove compartment 12 located in an automotive dashboard 13. The compartment 12 has a frame structure comprised of walls that define a bin 14 open at the front 15 and has a bottom wall 16 with a front edge margin 17 supporting the hinge assembly 10. It is desirable to have the door 11 operate in a slow acting manner when moving from a closed to an open position (the latter shown in FIG. 1). Slow acting, as used herein, means that when an operator touches and lightly pulls the latch handle 18 away from the bin 14, the door is caused to swing downwardly at a controlled rate a time period of 1–5 seconds.

Figure 2:
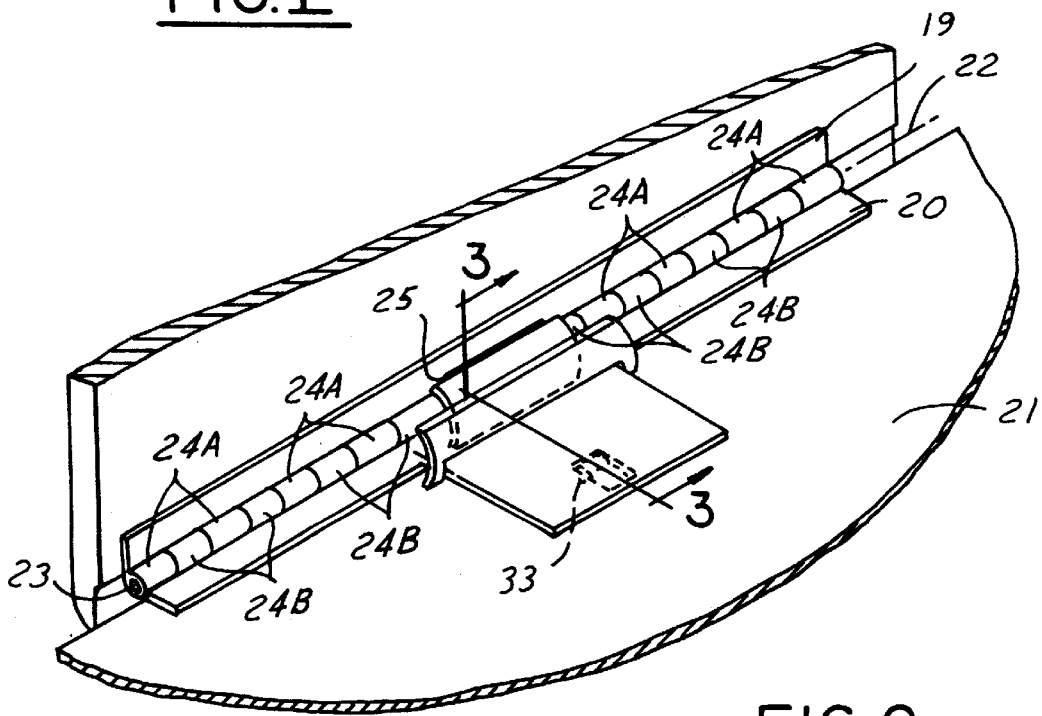
FIG. 2 is an enlarged schematic perspective view of the hinged portion of FIG. 1.
Figure 3:
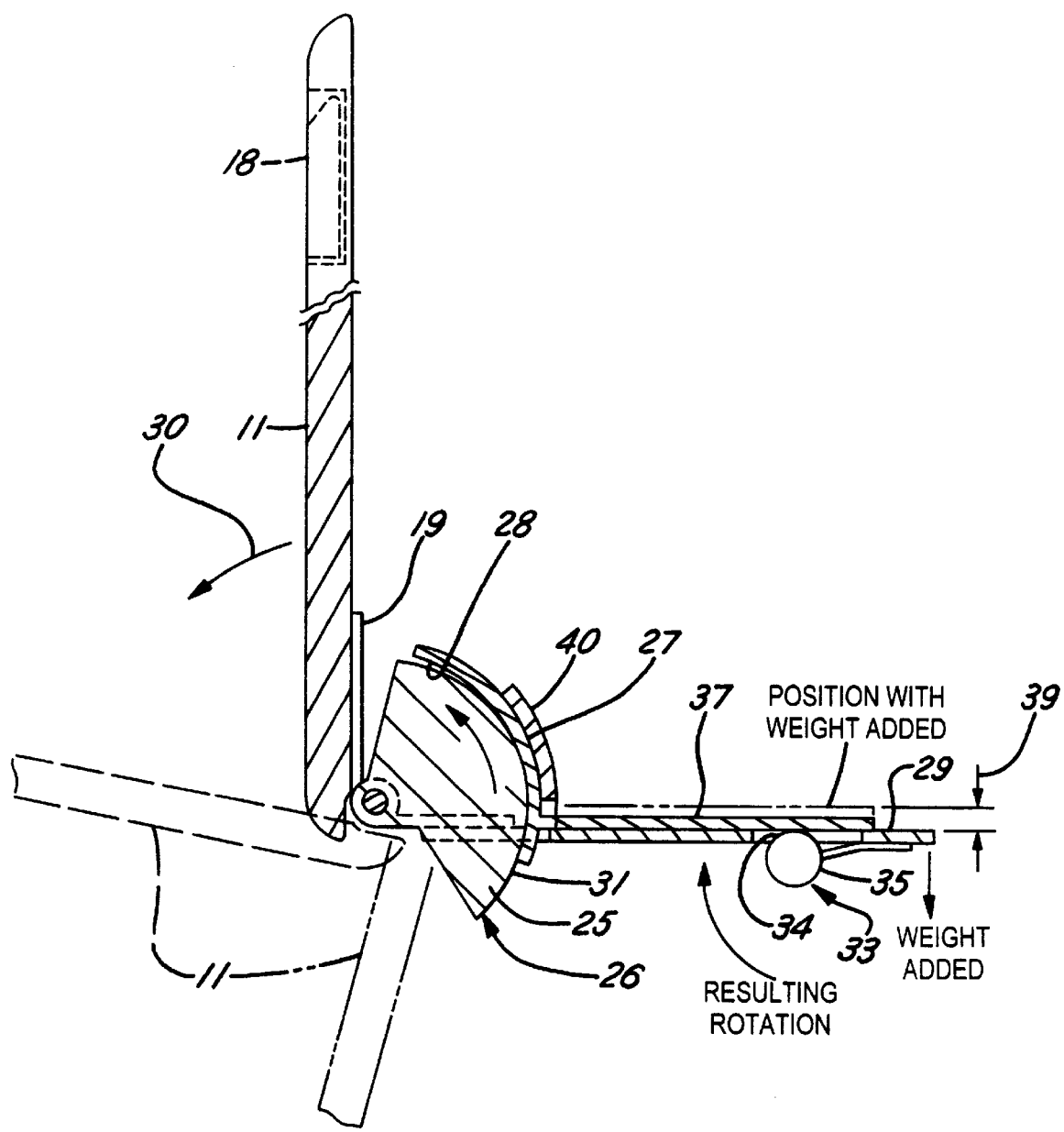
FIG. 3 is a further enlarged sectional view of the structure in FIG. 2 taken along line 3-3 thereof.
Figure 4:
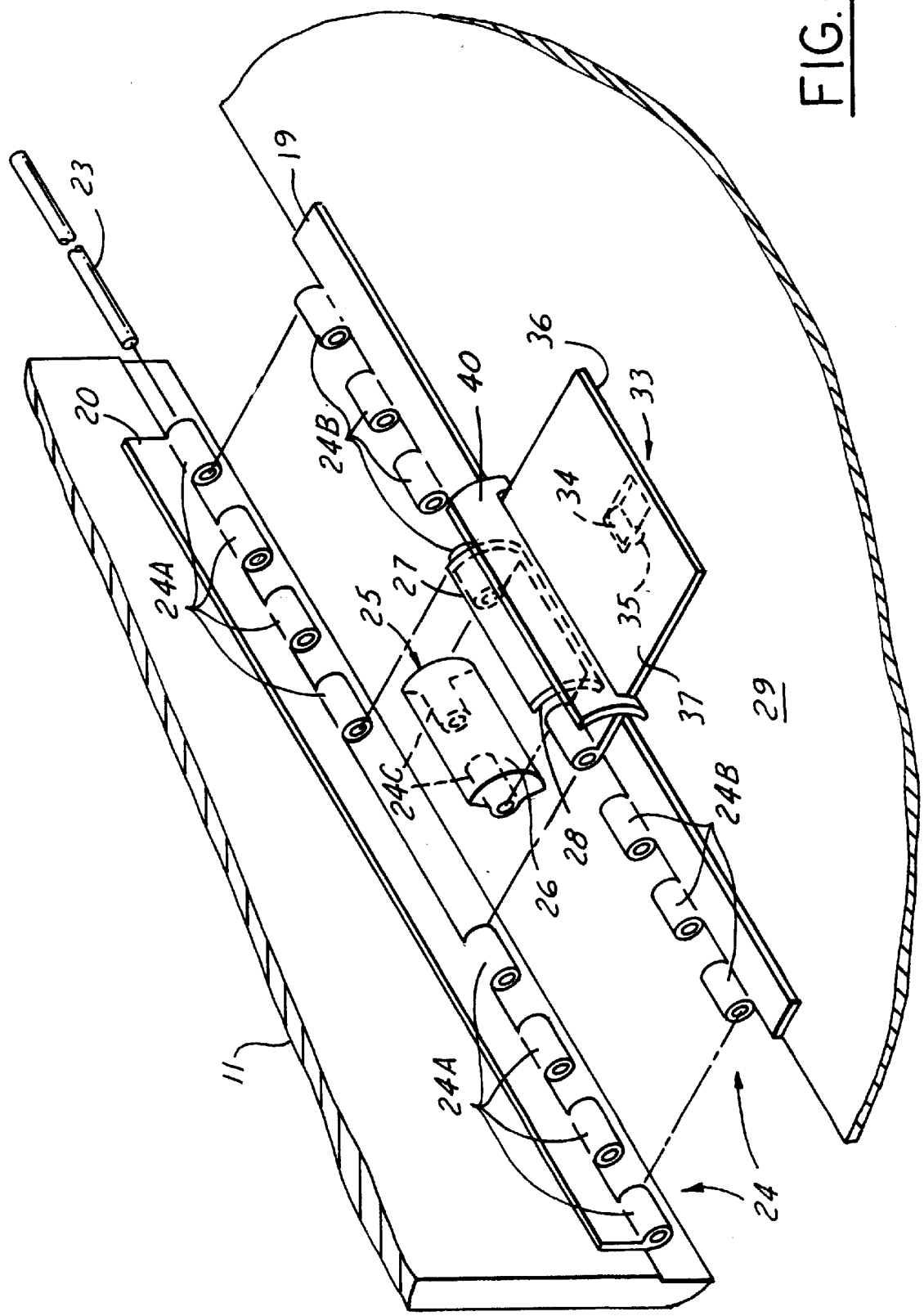
FIG. 4 is an exploded view of the principle structural elements of FIG. 3.

As shown in FIGS. 2, 3 and 4, the hinge assembly 10 has a first leaf 19 comprised, preferably of steel or plastic, which is secured to the front edge margin 17 of wall 16 and has a second hinge leaf 20 secured to surface 21 of the door 11. Both hinge leafs are movable about a common axis 22 created by pin 23 received coaxially in sleeves 24A, 24B structured respectively on the inner edges of the leafs. Also hinged on pin 23 is a plastic camming element 25 carrying a camming surface 26. The surface 26 is arranged eccentrically about axis 22 by positioning of sleeves 24C on a side of element 25. The camming element is integrated with hinge leaf 20 to be rotated with the door when opened.

A steel or plastic cam follower 27, having arcuate follower surface 28 for engaging the camming surface 26, is carried on panel 37 which in turn is hinged on pin 23 by sleeves 24B. The cam follower surface 28 is shaped with a regular contour that is generally at a constant radius from axis 23 whereby upon pivoting of the door in the direction of arrow 30, as shown in FIG. 3, the eccentric camming surface 26 pivots about axis 23, causing segment 31 of the surface in engagement with the follower surface 18 to moderately and progressively increase in friction as the camming segment 31 moves up along the follower surface 28.

To increase or ensure that the frictional engagement between the camming surfaces 26 and cam follower surface 28 is sufficient to slow the door opening movement to a time period of about 3 seconds, means 33 is provided to respond to weight added to either bin floor 29 to promote such controlled rate. Means 33 comprises a cam 34, pivotally supported on panel 29, which has a nub 35 positioned to be rotated by depression of bin wall 29 thereon as a result of added weight in the bin. Such cam 34 then engages the underside of panel 36 to raise it a measured amount 39 which causes the camming follower surface 28 to tilt about axis 22 and change (i.e., increase) the degree of rubbing engagement.

Cam brace 40 is rigidly connected to the bin walls 29 to assure stiffening back-up to the cam follower 27 thereby ensuring a threshold amount of frictional engagement.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A combination for a hinge assembly having first and second hinge leafs movable about a common axis, comprising:

(a) a first hinge leaf having a fixed integral plastic camming surface positioned eccentrically about said common axis;

(b) a second hinge leaf having an integral plastic cam follower surface positioned about said common axis to engage said camming surface with increasing friction as said surface is cammed thereagainst; and (c) means for increasing the adjustable frictional engagement between said camming surface and cam follower surface in response to weight added to a bin floor to control the rate at which said leafs rotate relative to each other.

2. The combination as in claim 1, which further comprises:

a bin attached to the second leaf;

a glove box door attached to said first leaf;

a panel pivotally supported about said common axis and carrying said camming follower surface; and a cam supported on said bin which is effective in raising said panel in response to weight added to said bin to increase the friction according to step (c).

3. The combination as in claim 1, which further comprises a glove box door secured to said first leaf; and a finger attached to said first leaf effective to progressively rotate the camming follower surface about the common axis upon movement of the first leaf relative to the second leaf to increase the rubbing friction between the camming surface and the camming follower surface.

4. The combination as in claim 2, which further comprises a cam brace secured to the bin and having a configuration effective to provide a stiffened back-up to the cam follower surface to ensure a threshold mount of frictional engagement between said camming surface and cam follower surface during opening of the door.

5. A compartment having a hinged door regulated as to opening rate comprising:
   (a) walls defining a compartment bin open at least at a frontal side with the opening defined by a frontal edge of a bottom wall;
   (b) a door hinged along said frontal edge for closing and opening said frontal side;
   (c) a cam integrally eccentrically hinged about said hinge axis and secured to said door for movement therewith;
   (d) a cam follower tiltably supported on said bottom wall of said bin bottom wall defining a camming follower surface that is at a constant radius from said hinge axis so that said cam may increasingly frictionally engage said follower when said door is open; and
   (e) means responsive to increasing weight added to the interior of said compartment to raise the camming follower surface for controllably increasing the friction between the cam and camming follower surface so that the door can be held in any opened position by the friction therebetween.

6. The compartment structure as in claim 5, in which said means responsive to increasing weight within the weight range of 2–5 pounds.

7. The compartment structure as in claim 5 which further comprises a cam brace rigidly connected to the bin walls to assure a stiffened back-up to the cam follower surface ensuring a threshold amount of frictional engagement.

8. The compartment structure as in claim 5, in which said camming surface and camming follower surface are comprised of a material promoting a friction coefficient therebetween in the range of 0.5–0.8 without lubrication.

\* \* \* \* \*